United States Patent [19]

Ozutsumi et al.

[11] 4,429,059
[45] Jan. 31, 1984

[54] PROCESS FOR PRODUCING FOAMABLE POLYOLEFIN PARTICLES

[75] Inventors: Shunichi Ozutsumi; Osamu Yamamoto, both of Nara, Japan

[73] Assignee: Sekisui Kaseihin Kogyo Kabushiki Kaisha, Nara, Japan

[21] Appl. No.: 495,108

[22] Filed: May 16, 1983

[30] Foreign Application Priority Data

May 14, 1982 [JP] Japan .................................. 57-82168

[51] Int. Cl.³ .............................................. C08J 9/18
[52] U.S. Cl. .............................. 521/60; 264/DIG. 5; 521/56; 521/910
[58] Field of Search .......................... 521/60, 56, 910; 264/DIG. 5

[56] References Cited

U.S. PATENT DOCUMENTS

| | | | |
|---|---|---|---|
| 3,743,611 | 7/1973 | Muroi et al. | 521/60 |
| 3,959,189 | 5/1976 | Kitamori | 521/60 |
| 4,168,353 | 9/1979 | Kitamori | 521/60 |
| 4,303,756 | 12/1981 | Kajimura | 521/60 |

*Primary Examiner*—Morton Foelak
*Attorney, Agent, or Firm*—Armstrong, Nikaido, Marmelstein & Kubovcik

[57] ABSTRACT

The present invention is directed to a process for producing foamable polyolefin particles comprising adding a mixture of 3 to 15 parts by weight of a blowing agent and 0.5 to 5 parts by weight of a blowing aid to 100 parts by weight of polyolefin particles maintained in a fluid state. The addition of the mixture of blowing agent and blowing aid is conducted under substantially anhydrous conditions, which result in the blowing agent being present in the particles in a gas phase and not a liquid phase. Polyolefin particles comprise polyolefin resin with vinylaromatic resin chemically bonded thereto.

5 Claims, No Drawings

PROCESS FOR PRODUCING FOAMABLE POLYOLEFIN PARTICLES

FIELD OF INVENTION

The present invention is directed to a process for producing foamable polyolefin particles and, more particularly, to a process for producing foamable polyolefin particles which can maintain an excellent foaming ability over a long period of time, which are capable of forming uniform cells, and which can be impregnated with a dye at a high impregnation efficiency and a good coloration state without uneven dyeing.

BACKGROUND OF THE INVENTION

Processes for impregnating a blowing agent, such as propane, butane or pentane, into polyolefin particles composed of polyolefin resin with at least a part of a vinylaromatic resin chemically bound thereto are described in U.S. Pat. Nos. 3,959,189 and 4,168,353. In these processes, the impregnation of the blowing agent is prepared by a step of providing a suspension of the polyolefin particles, a step of washing the particles with water, and a subsequent dehydrating step for removing a suspension stabilizer deposited on the surface of resulting foamable polyolefin particles after completion of the impregnation. Since these water washing and dehydrating steps are conducted under normal pressures, part of the impregnated blowing agent escapes during these steps, which results in a reduction in the expansion ratio of the resulting impregnated particles.

In colored foamable polyolefin particles prepared by addition of a dye or the like, defects have been encountered in that the efficiency of impregnating the dye is poor and in that washing of an impregnation vessel is necessary after completion of the impregnation, due to adhesion of the dye onto the walls of the vessel.

SUMMARY OF THE INVENTION

The present invention overcomes the above-described defects in the prior art, and provides a process for producing foamable polyolefin particles which does not require the steps of water washing and dehydration of resulting foamable polyolefin particles, after completion of impregnation of a blowing agent therein. Also, the present invention provides a process for preparing colored foamable polyolefin particles, wherein a dye is impregnated into the particles with a good impregnation efficiency. Namely, the present invention includes a process for producing foamable polyolefin particles which comprises adding, to 100 parts by weight of fluid-state polyolefin particles composed of polyolefin resin with at least part of a vinylaromatic resin chemically bound thereto, 3 to 15 parts by weight of a blowing agent and 0.5 to 5 parts by weight of a blowing aid under substantially anhydrous atmosphere to impregnate the blowing agent and the blowing aid in the particles so that the blowing agent and the blowing aid exist in the particle in gas phase and not in liquid phase.

DETAILED DESCRIPTION OF THE INVENTION

The polyolefin particles used in the present invention are composed of polyolefin resin with at least part of a vinyl-aromatic resin chemically bound thereto. The phrase at least part of a vinylaromatic resin "chemically bound thereto" means that at least part of the polyolefin resin molecular chains are grafted and/or cross-linked with vinylaromatic resin.

Such polyolefin particles can be obtained by processes described in U.S. Pat. Nos. 3,959,189 and 4,168,353 which comprise suspending polyolefin resin and vinylaromatic monomer in an aqueous suspension and polymerizing the monomer onto the resin.

The polyolefin resins to be used in the present invention include ethylene homopolymers, propylene homopolymers, and ethylene copolymers having an ethylene in a content of 50% or more by weight, such as an ethylene-vinyl acetate copolymer, and ethylene-butyl acrylate copolymer, and ethylene-methyl methcrylate copolymer.

The vinylaromatic resins to be chemically bound at least in part to the polyolefin resin include polystyrene, polymethylstyrene, polyhalogenated styrene, and styrene copolymers having a styrene in a content of 50 wt % or more, such as a styrenedivinylbenzene copolymer and a styrene-methyl methacrylate copolymer.

The ratio of the above-described polyolefin resin to vinylaromatic resin used is, preferably, 20 to 70 wt % of the polyolefin resin and 80 to 30 wt % of the vinylaromatic resin.

If the amount of the polyolefin resin used is less than 20 wt %, rigidity of a resulting molding becomes too strong, thereby resulting in an unsuitable cushioning material. On the other hand, if the amount of the polyolefin resin used exceeds 70 wt %, the blowing agent contained in the foamable polyolefin particles escapes very fast, and foamed moldings with a low bulk density are difficult to obtain.

In the present invention, the polyolefin resin is used in the form of pellets or globular particles.

A blowing agent is used for rendering the polyolefin particles foamable. The blowing agents used have the property that they do not dissolve or only slightly swell the polyolefin resin and the vinylaromatic resin formed on the polyolefin resin particles. Further, the blowing agents should have a boiling point lower than the softening point of the polyolefin resin and should be gaseous or liquid at room temperature (about 20° to 30° C.) and normal pressure (about atmospheric). These blowing agents are well known in the art and generally have boiling points ranging from −42° C. to 80° C., more generally −10° C. to 36° C. Suitable blowing agents include aliphatic hydrocarbons such as n-propane, n-butane, iso-butane, n-pentane, iso-pentane, n-hexane and neopentane; cycloaliphatic hydrocarbons, such as cyclobutane and cylopentane; and halogenated hydrocarbons, such as methyl chloride, ethyl chloride, methylene chloride, trichlorofluoromethane, dichlorofluoromethane, dichlorodifluoromethane, chlorodifluoromethane, and dichlorotetrafluoroethane, etc. These blowing agents can be used alone or as mixtures of two or more thereof. The preferable amount of the blowing agent is in a range of about 3 to 15% by weight based on the weight of the formed polyolefin resin particles. Of the above-described blowing agents, n-butane and n-pentane are preferably used in the present invention.

In the present invention the above-described blowing agent is used in combination with a blowing aid. This blowing aid causes the interior of the particles to be in a plastic state, thereby facilitating the foaming of the particles. When foamable particles are heated, the expansion ratio reaches a maximum level after a certain period of time.

The blowing aid is used to control the time necessary for the particles to reach the maximum expansion ratio, so as to be within range of 2 to 10 minutes, preferably 3 to 6 minutes. The use of the blowing aid facilitates prefoaming procedure and saves energy. In addition, the surface state of resulting moldings and welding of particles is remarkably improved by the use of the blowing aid, when compared to processes where it is not used.

The blowing aid is used for the purpose of foaming the foamable polyolefin particles in a short period of time at a high expansion ratio. Blowing aids which are miscible with the particles can be used in the present invention.

Representative blowing aids are compounds, which have a boiling point of about 80° C. to about 150° C., such as benzene, toluene, xylene, trichlene, perchlene, cyclohexane, carbon tetrachloride, styrene monomer, etc.

This blowing aid is used in an amount of 0.5 to 5 parts by weight per 100 parts by weight of the polyolefin particles.

This blowing agent and the blowing aid are added to polyolefin particles in a fluid state under a substantially anhydrous atmosphere. The phrase "under a substantially anhydrous atmosphere" means that aqueous mediums, such as a suspension, are not used, which is different from the types of processes of adding the blowing agent and the blowing aid to polyolefin particles suspended in an aqueous suspension.

In the present invention, the blowing agent must be impregnated in the polyolefin particles in a gas phase. That is, if the impregnation procedure is conducted in a liquid phase, the following defects result. Of the above-described blowing agents, those which exert a comparatively strong swelling effect on polyolefin particles, such as n-pentane and iso-pentane, fail to provide foamable polyolefin particles having uniform cells due to the difference in impregnation rate between a blowing agent portion in liquid phase and a blowing agent portion in gas phase. Further, the polyolefin particles in contact with the blowing agent portion in liquid phase bond to each other, because the particle surface is attacked by the liquid phase blowing agent portion.

Accordingly, in the present invention when using such blowing agents, they must be quantitatively added so as not to form a liquid phase portion. On the other hand, when using those blowing agents which are low-boiling compounds and which exert a comparatively weak swelling effect on polyolefin particles, such as n-propane and n-butane, these may be added all at once. This is because they are impregnated in polyolefin particles so fast that they are absorbed in a short period of time and are converted from liquid phase to gas phase in a sufficiently short period of time. As a result, impregnation is effected in the gas phase without allowing a liquid phase portion to exist after completion of the impregnation, thereby providing foamable polyolefin particles having uniform cells and being free of any bonding between the particles.

During the addition of the blowing agent and the blowing aid to the polyolefin particles according to the present invention, the polyolefin particles must be in a fluid state. This fluid state is a state wherein polyolefin particles are not at rest. In order to keep the polyolefin particles in the fluid state, rotary vessels such as a V-blender or a tumbler are used at 10 to 30 rpm. It is possible to provide the fluid state by stirring using a stirrer, however, stirring polyolefin particles in an anhydrous state requires a large amount of power; and therefore, this is not preferred. In the present invention, a pressure-resistant vessel is used for conducting the gas phase impregnation.

As described heretofore, addition of the blowing agent and the blowing aid to fluid-state polyolefin particles is conducted quantitatively or all at once depending upon the type of the blowing agent used. In conducting the quantitative addition, the blowing agent is added dropwise at a rate controlled so that the addition is completed in about 5 to about 180 minutes. By this controlling of the addition of the blowing agents a foamable polyolefin particle can be obtained; which, upon foaming, does not undergo coarsening of cells, form uneven cells or bond the particles to each other.

If the time for adding the blowing agent exceeds 180 minutes, the cells undergo no further change, thus extending the adding time is economically disadvantageous.

In the present invention, the blowing agent and the blowing aid are used in a mixture. The use of the mixture of the blowing agent and the blowing aid provides particles having uniform cells.

In the present invention, the polyolefin particles are placed in a vessel equipped with a rotating mechanism, and the blowing agent and the blowing aid are added thereto while the particles are brought into a fluid state in a vessel being rotated by means of the rotating mechanism. After completion of, or during this addition, the contents of the vessel are maintained or heated to a temperature of from ordinary or room temperature to 70° C., preferably, to about 50° to 60° C. After raising the temperature, the contents are maintained at the same temperature for a given period of time, then cooled to ordinary temperatures, followed by removing the foamable product.

When n-butane and toluene are used as the blowing agent and a blowing aid, respectively, and the contents are kept at temperatures of 50° to 55° C., about 2 hours are sufficient for heating the contents to 50° to 55° C. and cooling to ordinary temperatures. When n-pentane and toluene are used as a blowing agent and a blowing aid, respectively, about 3 hours are sufficient for heating to 50° to 55° C., after dropwise addition in 40 to 60 minutes, and cooling to ordinary temperatures.

When n-pentane is used as a blowing agent, it is preferably used in an amount ranging from 7.0 to 12.5, preferably 9.5 to 10.5, parts by weight based on the weight of polyolefin particles. If the amount exceeds 12.5 parts by weight, the resulting foamable polyolefin particles undergo, upon foaming, coarsening of formed cells and destruction of cell walls. On the other hand, if less than 7.0 parts by weight, a sufficient expansion ratio cannot be attained.

By applying a dye onto polyolefin particle surfaces before addition of the blowing agent and the blowing aid, or by dissolving a dye in the blowing agent or the blowing aid and adding the resulting solution to the particles; the process of the present invention advantageously provides foamable polyolefin particles which are beautifully colored in a good coloration state with no uneven coloration and which have a high impregnation efficiency of dye.

As the dye used for obtaining dyed foaming polyolefin particles, various known dyes such as monoazo dyes, diazo dyes, anthraquinone dyes, etc., are employable. In order to obtain the dyed foaming polyolefin particles, predetermined amounts of polyolefin particles which are used in the present invention are first charged into a vessel. Thereafter, a predetermined amount of the dye and a small amount of a blowing agent are charged into the sealed vessel, whereby the dye and blowing agent are stirred and mixed with the polyolefin particles. The stirring and mixing of the dye and blowing agent with the polyolefin particles can be conducted either individually or simultaneously. In general, the dye is preliminarily added to the polyolefin particles charged into the sealed vessel to thereby stir and mix therewith. This causes the dye to cover or adhere to the surfaces of the particles. Then, a small amount of the blowing agent is gradually added thereto by, for example, dropwise addition, to thereby thoroughly effect the stirring and mixing. After the dye has been uniformly adhered to the surfaces of the polyolefin particles, the residual amount of the blowing agent and a predetermined amount of a blowing aid are added thereto.

In the present invention, since the blowing agent and blowing aid are impregnated into the polyolefin particles within a short period of time, it is necessary to select dyes which can be impregnated within a short period of time. For such purposes, it is preferred to use those having a small molecular weight and a solvation effect against the polyolefin particles.

The amount of the dye to be added may be comparatively small in comparison with the amount of polyolefin particles and usually is 0.005 to 1.0 parts by weight, based on 100 parts by weight of the particles, with 0.03 to 0.6 parts by weight being preferred. If the amount is too high, an excess amount of the dye remains, and therefore, such is not preferred.

Flame retardants such as tris(2,3-dibromopropyl)-phosphate, hexabromododecane, tribromophenyl allyl ether, etc., antiblocking agents for pre-foaming such as ethylenebisamide, antistatic agents such as polyethylene glycol, etc. may be used in the present invention.

The foamable polyolefin particles obtained by the present invention possess an excellent foaming ability over a long period of time.

In other words the foamable polyolefin obtained from the present invention have a long shelf life, in that they can be foamed a long period of time after their porduction and still provide a foam containing uniform cells. Thus, the foamable polyolefin particles of the present invention are extremely advantageous in view of storage and transportation, when compared to conventional foamable polyolefin particles. In particular, when stored at low temperatures of about 10° C., the foamable polyolefin particles obtained by the present invention do not undergo any change in their foaming ability and moldability for 2 to 3 weeks.

In addition, colored foamable polyolefin particles obtained by using a dye in accordance with the present invention are uniformly colored to the core.

The present invention will now be described in more detail by reference to the following examples which, however, are not to be construed as limiting the present invention in any way.

EXAMPLE 1

1,500 Parts by weight of polyolefin particles, obtained by subjecting 40% by weight of polyethylene and 60% by weight of styrene monomer to polymerization conditions in an aqueous medium, were placed in a cylindrical vessel (250 mm × 180 φmm) equipped with a porous screen through which the particles can not pass, but through which a blowing agent gas can pass; then the particles above the screen were uniformly stirred by a stirring blade.

A mixture solution of 225 parts by weight of pentane and 30 parts by weight of toluene was introduced into the vessel under the screen in about 5 minutes, while the particles were maintained in fluid state; thereafter impregnation was conducted for 3 hours while keeping the temperature at 35° C.

This impregnating procedure was carried out with the vessel tightly closed. After 3 hours of impregnation, the amount of the mixture of pentane and toluene absorbed by the particles was measured immediately after taking the particles out of the vessel and found to be 196 parts by weight.

The thus-obtained foamable polyolefin particles were allowed to stand in the atmosphere for a given period of time; they were then heated by introducing a 0.2 kg/cm$^2$ steam into a foaming vessel (about 0.4 m$^3$) to obtain foams; and thereafter, the expansion multiple and the cell state were measured. Further, the characteristics of pentane and toluene absorption and migration into the interior of the resin particles was determined in terms of the size of the core (non-impregnated) formed in the center of the particles. The results thus obtained are shown in Table 1.

TABLE 1

| Standing Time | Expansion Multiple | State of Cells | Presence of Core |
| --- | --- | --- | --- |
| Immediately after removal | 38 (30 sec)*[1] | good*[2] | no cores |
| 2 hrs. | 36 (30 sec) | good | no cores |
| 4 hrs. | 38 (60 sec) | good | no cores |
| 12 hrs. | 30 (60 sec) | good | no cores |

*[1] The time given in parentheses is the time for introducing steam.
*[2] The rating "good" means uniform and fine foamed cells having a definite shape.

EXAMPLE 2

A foam was prepared in the same manner as in Example 1 except for changing the amount of pentane to 165 parts, using 37 parts by weight of cyclohexane in place of toluene, and changing the impregnation conditions to 50° C. in impregnating temperature and 2 hours in impregnating time. The amount of a mixture of pentane and toluene absorbed was measured after the 2-hr. impregnation procedure. The absorption amount was found to be 181 parts by weight immediately after removing the impregnation product. Foaming properties versus standing time were also evaluated in the same manner as in Example 1. The results thus obtained are tabulated in Table 2.

TABLE 2

| Standing Time | Expansion Multiple | State of Cells | Presence of Cores |
| --- | --- | --- | --- |
| Immediately after removal | 35 (30 sec) | good | no cores |
| 2 hrs. | 33 (30 sec) | good | no cores |
| 4 hrs. | 37 (60 sec) | good | no cores |
| 12 hrs. | 29 (60 sec) | good | no cores |

EXAMPLE 3

3,000 Parts by weight of polyolefin particles, obtained by subjecting 50% by weight of polyethylene and 50% by weight of styrene monomer to polymerization conditions in an aqueous medium, was placed in a rotary vessel, and a mixture of 450 parts by weight of pentane and 40 parts by weight of toluene was added into the vessel through the shaft in the vessel. Upon this addition, the rotary vessel and the resin were maintained at 35° C. and the adding rate was adjusted so that the total amount of the mixture could be added in three hours.

The amount of the mixture solution absorbed by the foamable particles removed after a 3 hour impregnation was measured to be 407 parts by weight.

Foaming properties of the foamable particles with the passage of time and state of cells were examined in the same manner as in Example 1.

TABLE 3

| Standing Time | Expansion Multiple | State of Cells | Presence of cores |
|---|---|---|---|
| Immediately after removal | 34 (30 sec) | good | no cores |
| 2 hrs | 30 (30 sec) | good | no cores |
| 4 hrs | 31 (60 sec) | good | no cores |
| 12 hrs | 26 (60 sec) | good | no cores |

EXAMPLE 4

The same impregnation procedure as described in Example 3 was conducted using 3,000 parts by weight of polyolefin particles composed of 30% by weight of polyethylene and 70% by weight of styrene monomer and a mixture of 300 parts by weight of pentane and 55 parts by weight of xylene.

The rate of adding the mixture solution dropwise was adjusted so that the mixture solution could be added in 2 hours while keeping the impregnation temperature of 60° C. After completion of the dropwise addition, the resulting product was rotated for further 1 hour while keeping the temperature at 60° C., then cooled to ordinary temperatures, followed by removing foamable particles out of the rotary vessel. The particles were evaluated in the same manner as in Example 3. The amount of the mixture absorbed by the foamable particles was measured to be 340 parts by weight immediately after removal.

TABLE 4

| Standing Time | Expansion Multiple | State of Cells | Presence of Cores |
|---|---|---|---|
| Immediately after removal | 46 (30 sec) | good | no cores |
| 2 hrs | 43 (30 sec) | good | no cores |
| 4 hrs | 47 (45 sec) | good | no cores |
| 12 hrs | 41 (60 sec) | good | no cores |

EXAMPLE 5

400 Parts by weight of the polyolefin particles used in Example 1 was placed in a double-cone tumbler having an internal volume of 850 liters and being resistant against a pressure of 10 kg/cm$^2$. 38 Parts by weight of n-butane and 10 parts by weight of toluene were added to the vessel all at once while rotating the tumbler at 18 rpm. Thereafter, the inside temperature was raised to 50° C. in about 1 hour, and was then kept at 50° C. for further one hour, followed by cooling with 18° C. well water. After cooling, the foamable particles were removed and evaluated in the same manner as in Example 1. The amount of the mixture absorbed by the foamable particles was measured to be parts by weight immediately after the removal.

TABLE 5

| Standing Time | Expansion Multiple | State of Cells | Presence of Cores |
|---|---|---|---|
| Immediately after removal | 60 (15 sec) | good | no cores |
| 2 hrs | 40 (45 sec) | good | no cores |
| 4 hrs | 35 (60 sec) | good | no cores |
| 12 hrs | 10 (60 sec) | good | no cores |

EXAMPLE 6

400 Parts by weight of the polyolefin particles used in Example 1 were placed in a double-cone tumbler having an internal volume of 850 liters and being resistant against a pressure of 10 kg/cm$^2$. 0.08 Parts by weight of an anthraquinone green dye (trade name: Diaresin Fast Brill. Green 5G; made by Mitsubishi Chemical Industries, Ltd.) was added thereto while rotating the tumbler at 18 rpm. The rotation was further continued for 10 minutes. Then, 38 parts by weight of n-butane and 10 parts by weight of toluene were added thereto all at once, and the inside temperature was raised to 55° C. in about 1 hour. The rotation was maintained for an additional hour while maintaining the temperature at 55° C., followed by cooling with 18° C. well water and removing the foamable particles out of the tumbler. Thus, colored foamable particles were obtained. The resulting colored foamable particles were uniformly colored and had quite the same fluidity as that obtained in Example 5, and were therefor easy to handle. Further, when the colored foamable particles were pressed onto white paper by a finger, the white paper was not colored. Therefore, it is apparent that the dye was not on the surface of the particles but was uniformly impregnated therein.

The amount of mixture absorbed by the colored foamable particles immediately after removal and evaluation of the particles according to Example 1 were conducted in the same manner as with the foamable particles of Example 5.

Additionally, colored foamable particles were similarly obtained using an acenaphthene yellow dye (trade name: Diaresin Yellow F; made by Mitsubishi Chemical Industries, Ltd.) or an azo red dye (trade name: Diaresin Red H; made by Mitsubishi Chemical Industries, Ltd.) in place of the anthraquinone green dye. These dyes were similarly uniformly impregnated in the particles.

COMPARATIVE EXAMPLE 1

1,500 Parts by weight of the polyolefin resin particles in Example 1 was placed in a cylindrical vessel (250 mm × 180 φmm) containing no screen. Then, an emulsion dispersion previously prepared from 30 parts by weight of toluene, 0.5 parts by weight of an emulsifier (sodium dodecylbenzenesulfonate), and 2,000 parts by weight of water was added thereto to prepare a suspension. Subsequently, 225 parts by weight of pentane was added thereto, and the resulting mixture was stirred for 4 hours at 50° C. to effect impregnation. The thus-obtained foamable particles were removed and dehydrated.

Foams were prepared from the particles after allowing to stand for a given time to examine the foaming properties and the state of cells, in the same manner as Example 1.

TABLE 6

| Standing Time | Expansion Multiple | State of Core | Presence or Absence of Core |
| --- | --- | --- | --- |
| Immediately after removal | 30 (30 sec) | bad | present |
| 2 hrs | 22 (60 sec) | bad | absent |
| 4 hrs | 15 (60 sec) | bad | absent |
| 12 hrs | 7 (60 sec) | bas | absent |

As is seen from the above results, the foamable particles obtained by the present invention have a good state of cell, or in other words, have uniform and fine foamed cells with a definite shape. The cells of the foamable particles obtained by the present invention do not change with the passage of time and always provide moldable cells. In addition, with respect to foaming properties, the foamable particles obtained by the process of the present invention do not undergo a serious decrease in expansion multiple, even when allowed to stand for a long period of time, and therefore, keep their excellent foamability.

On the other hand, under very similar conditions, foamable particles, which are obtained in a process using a liquid-phase impregnation (or dipping method), absorb the blowing agent and a solvent in such excessive amounts that foamed particles obtained by heating these foamable particles are extremely easily contracted and contain cells too coarse to mold.

Foamable particles obtained by suspension impregnation are also found to form coarse cells and undergo reduction in foamability with the passage of time.

While the invention has been described in detail and with reference to specific embodiments thereof, it will be apparent to one skilled in the art that various changes and modifications can be made therein without departing from the spirit and scope thereof.

What is claimed is:

1. A process for producing foamable resin particles which comprises adding a mixture of 3 to 15 parts by weight of a blowing agent and 0.5 to 5 parts by weight of a blowing aid to 100 parts by weight of polyolefin particles in a fluid state, the particles comprising a resin prepared by polymerizing 20 to 70 wt. % of polyolefin resin and 80 to 30 wt. % of vinyl aromatic monomer in an aqueous medium so that the vinyl aromatic resin is chemically bonded to the polyolefin resin, and the blowing aid is miscible with the resin particles and has a boiling point of about 80° C. to about 150° C., wherein the adding is conducted under substantially anhydrous conditions so that the blowing agent is present in the particles in a gas phase and not a liquid phase.

2. The process as described in claim 1, wherein said polyolefin resin is an ethylene homopolymer or copolymer resin.

3. The process as described in claim 1, wherein said vinylaromatic monomer is styrene.

4. The process as described in claim 1, wherein the mixture of blowing agent and the blowing aid and resin particles are maintained at a temperature from ordinary temperature to 70° C. during the adding step.

5. A process for producing foamable resin particles which comprises the steps of:
    adding to a vessel, 100 parts by weight of resin particles comprising polyolefin resin with vinylaromatic resin chemically bonded thereto,
    moving the resin particles in a manner so that the resin particles are in a fluid state and
    contacting the resin particles while maintaining the fluid state with an anhydrous mixture of 3 to 15 parts by weight of a blowing agent and 0.5 to 5 parts by weight of a blowing aid, thereby porviding foamable resin particles consisting of the resin particles and the mixture, the mixture being in a gas phase,
    wherein the resin particles are prepared by polymerizing 20 to 70 wt. % of polyolefin resin and 80 to 30 wt. % of vinyl aromatic monomer in an aqueous medium, and the blowing aid is miscible with the resin particles and has a boiling point of about 80° C. to about 150° C.

* * * * *